United States Patent
Haulick et al.

(10) Patent No.: US 7,643,641 B2
(45) Date of Patent: Jan. 5, 2010

(54) SYSTEM FOR COMMUNICATION ENHANCEMENT IN A NOISY ENVIRONMENT

(75) Inventors: Tim Haulick, Blaubeuren (DE);
Gerhard Uwe Schmidt, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 393 days.

(21) Appl. No.: 10/556,232

(22) PCT Filed: May 10, 2004

(86) PCT No.: PCT/EP2004/004980

§ 371 (c)(1),
(2), (4) Date: Oct. 12, 2006

(87) PCT Pub. No.: WO2004/100602

PCT Pub. Date: Nov. 18, 2004

(65) Prior Publication Data

US 2007/0053524 A1  Mar. 8, 2007

(30) Foreign Application Priority Data

May 9, 2003 (EP) .................................. 03010490
May 15, 2003 (EP) .................................. 03010913

(51) Int. Cl.
*H04R 1/02* (2006.01)
(52) U.S. Cl. .................... 381/92; 381/122; 367/119; 367/124
(58) Field of Classification Search ................ 381/86, 381/91–92, 94.1–94.3, 94.5, 123, 122, 26, 381/94.7, 313; 367/118–119, 124
See application file for complete search history.

(56) References Cited

U.S. PATENT DOCUMENTS

| | | | | |
|---|---|---|---|---|
| 5,581,620 A * | 12/1996 | Brandstein et al. | ............ | 381/92 |
| 5,721,771 A * | 2/1998 | Higuchi et al. | ......... | 379/406.07 |
| 6,363,156 B1 * | 3/2002 | Roddy | ............ | 381/86 |
| 6,778,791 B2 * | 8/2004 | Shimizu et al. | ............ | 399/75 |
| 7,068,796 B2 * | 6/2006 | Moorer | ............ | 381/92 |
| 7,206,418 B2 * | 4/2007 | Yang et al. | ............ | 381/92 |
| 7,224,809 B2 * | 5/2007 | Hoetzel | ............ | 381/92 |
| 7,274,794 B1 * | 9/2007 | Rasmussen | ............ | 381/92 |
| 2001/0038698 A1 * | 11/2001 | Breed et al. | ............ | 381/86 |
| 2003/0072461 A1 | 4/2003 | Moorer | | |
| 2003/0185410 A1 * | 10/2003 | June et al. | ............ | 381/94.1 |

FOREIGN PATENT DOCUMENTS

| | | |
|---|---|---|
| DE | 101 56 954 A1 | 6/2003 |
| EP | 1 083 543 A2 | 3/2001 |
| EP | 1 116 961 A2 | 7/2001 |
| EP | 1 343 351 A1 | 9/2003 |
| GB | 2 097 121 A | 10/1982 |
| JP | 07 176178 A | 7/1995 |

* cited by examiner

*Primary Examiner*—Xu Mei
*Assistant Examiner*—Disler Paul
(74) *Attorney, Agent, or Firm*—Sunstein Kann Murphy & Timbers LLP (57) ABSTRACT

The invention is directed to a method comprising receiving input signals emanating from at least two microphone arrays each comprising at least two microphones, processing the input signals of each microphone array by a beamformer to determine temporal and spatial information about the input signals of each microphone array.

13 Claims, 4 Drawing Sheets

SYSTEM FOR COMMUNICATION ENHANCEMENT IN A NOISY ENVIRONMENT

The invention is directed to a method and a system for communication enhancement in a noisy environment, in particular, for improving communication in a vehicular cabin.

In a noisy environment, communication between two persons is often rendered difficult or almost impossible if the noise is at a similar loudness level as the speech. For example, in a vehicular cabin of a car, a strong background noise is present due to engine and wind noise. Further noise sources deteriorating the mutual understanding are loudspeakers of a car radio or a hands free system. Due to this plurality of different noise sources, a communication between front seat and back seat passengers is very difficult, in particular, when the vehicle is moving at a high speed.

To improve communication in a vehicle, an indoor communication system for cars has been proposed in the prior art. According to this system, one microphone is associated with each passenger seat, including the drivers' seat. This means that in the vicinity of each seat or in the vicinity of a passenger's head sitting on the seat, a microphone is arranged. Each microphone records the speech of the respective passenger and the corresponding signals are output via loudspeakers in the car.

This prior art system has several drawbacks. First of all, the system has a poor signal-to-noise ratio (SNR). Furthermore, the system is highly inflexible; once installed, there is almost no possibility to vary the directivity and, in this way, suppress signals emanating from an unwanted direction. In addition, also a suppression of liveness is complicated. Furthermore, a detection of speech activity, i.e. detecting which passenger is speaking, is only possible under difficulties.

Therefore, it is the problem underlying the invention to provide a method that enables communication in a noisy environment, wherein the method has an improved signal-to-noise ratio and reduced liveness. This problem is solved by a method according to claim 1.

Accordingly, a method for enhancing communication in a noisy environment is provided comprising:

receiving input signals emanating from at least two microphone arrays each comprising at least two microphones, processsing the input signals of each microphone array by a beamformer to determine temporal and spatial information about the input signals of each microphone array.

A beamformer processes signals emanating from a microphone array to obtain a combined signal. In its simplest form (Delay-and-Sum beamformer), beamforming comprises delay compensation and summing of the signals. Beamforming allows to provide a specific directivity pattern for a microphone array.

Due to the use of input signals emanating from several microphones constituting a microphone array and the processing of these input signals by beamformers, the method allows an improvement of the signal-to-noise ratio. The use of microphone arrays and corresponding beamformers renders the method highly flexible. First of all, each beamformer of a microphone array can be adjusted independently of the other beamformers and, in this way, adapted to its ambient conditions. In particular, the obtained temporal and spatial information can be used to detect noise sources for each microphone array and to direct the zeros of the corresponding beamformer into the direction of these noise sources. Furthermore, the determined information can also be used to detect which one of the microphone arrays actually receives wanted speech signals and, in this way, identify an active speaker. Furthermore, due to the beamforming, an adaption of the directivity can be performed.

According to a preferred embodiment, the input signals of each microphone array can be processed by a wanted signal beamformer to obtain a wanted signal and by a blocking beamformer to obtain a blocking signal, preferably wherein the wanted signal beamformer is an adaptive beamformer.

A wanted signal beamformer is configured to yield a signal in which the wanted signal components, i.e., signal components being received from a preferred direction, are transmitted without attenuation and signals from other directions are attenuated. A blocking beamformer, on the other hand, suppresses wanted signal components, i.e., signals being received from the preferred direction, and transmits signals from other directions of incidence with minimum distortions. The wanted signal and the blocking signal are used to determine speech activity information and directional information.

If the wanted signal beamformer is configured as an adaptive beamformer, it can "react" to variations in the input signals, for example, due to changes in the noise sources (switching on of car radio, opened window, enhanced motor noise, and the like) by re-determining relevant parameter values of the beamformer—such as filter coefficients—either continuously or on a regular basis during operation. With such an adaptive wanted signal beamformer, spatial zeros can be directed to specific noise sources. In this way, it is possible to specifically suppress unwanted signals without, for example, a complicated multi-channel echo cancellation.

Advantageously, processing the input signals of each microphone array can further comprise deciding whether a signal is transmitted from a wanted signal direction, wherein the wanted signal beamformer is an adaptive beamformer being adapted only if no signal is transmitted from the wanted signal direction.

Due to the deciding step, the adaption of the beamformer can be performed in a more precise manner. In particular, if no signal is transmitted from the wanted signal direction (for example, due to a speaker located in the wanted signal direction) no interference between such a signal and noise signals is present, thus, simplifying the adaption of the beamformer.

Preferably, deciding can comprise determining a wanted signal power and a blocking signal power, wherein the wanted signal beamformer is adapted only if the blocking signal power is larger than a predetermined constant times the wanted signal power.

This inequality yields a criterion that can be checked in a simple way. The predetermined constant is to be chosen such that the criterion is robust even if the signal powers are fluctuating.

Using this criterion, it is possible to determine which signals—from the wanted signal direction or the other directions—are dominating. The case of dominating signals from the blocking beamformer may arise if, for example, a microphone array mainly receives car radio signals but no speech signals of a corresponding speaker. In this case, an adaption of the wanted signal beamformer is performed by directing the spatial zeros of the beamformer to the car radio loudspeakers, thus, improving the signal-to-noise ratio of later speech signals.

According to a preferred embodiment, the above described methods can comprise echo cancelling and/or feedback cancelling and/or feedback suppressing the beamformer output signals. This yields a further improvement of the output signal. For example, a build-up (resonance rise) of the system can be avoided. In particular, potential feedback frequencies can be detected and corresponding notch filters can be placed at these frequencies.

According to an advantageous embodiment, the method can further comprise overdrive detecting preceding the processing of the input signals by the beamformers. This can be achieved, for example, by comparing the absolute value of each signal with a predetermined threshold. The overdrive detection serves to avoid a malfunctioning of the echo and/or feedback cancellation and/or feedback suppression due to any overdrive.

Preferably, the above described methods can further comprise detecting speech activity for each microphone array. Speech activity is detected based on the temporal and spatial information determined by the beamformers. Speech activity means that a microphone array receives speech signals (wanted signals) from a preferred direction (wanted signal direction). If, for example, a first microphone array is provided for the drivers seat in a car and a second microphone array is provided for a rear passenger seat, speech activity for the first microphone array is only detected if the driver is speaking.

According to a preferred embodiment, detecting speech activity for a microphone array can comprise:

determining a wanted signal power, a blocking signal power and a background noise signal power, comparing the wanted signal power with the blocking signal power and the background noise signal power.

Preferably, speech activity can be detected for a microphone array using a two criteria: a temporal and a spatial criterion. Thus, speech activity is detected if the wanted signal power is larger than a first predetermined constant times the background noise signal power (first criterion) and larger than a second predetermined constant times the blocking signal power (second criterion). By comparing the wanted signal power with the background noise signal power, temporal information is checked and by comparing the wanted signal power with the blocking signal power, spatial information is checked. In this way, two criteria are used to detect speech activity, thus, allowing a very robust identification. It is to be pointed out that the use of microphone arrays allows in a highly advantageous manner to determine the required signals for the spatial criterion.

Preferably, the determined powers can be short-time powers. Furthermore, according to an advantageous embodiment, the background noise signal power $\hat{\sigma}_H(n)$ can be determined using the power of the wanted signal beamformer $\hat{\sigma}_N(n)$ according to $$\hat{\sigma}_H(n)=\{\hat{\sigma}_H(n-1),\hat{\sigma}_N(n)\}(1+\epsilon). \quad (1)$$

The constant $\epsilon$ is small predetermined number between 0 and 1.

Thus, in a typical scenario, if no speech signal is present, the background noise signal power is determined as the wanted signal power times $(1+\epsilon)$. However, if the microphone array starts to record speech, the wanted signal power usually will be larger than the background noise signal power at a preceding time step; thus, the background noise signal power at a present time step is determined as the background noise signal power at the preceding time step times $(1+\epsilon)$.

In order to detect a most active speaker, i.e., a loudest speaker, according to a preferred embodiment, the method can further comprise comparing the wanted signal powers of at least two microphone arrays and determining a highest power.

This information can be used to attenuate or even suppress signals emanating from microphone arrays except for the microphone array of the loudest speaker.

In another preferred embodiment, the method can further comprise applying an attenuation to the processed input signals of a microphone array if no speech activity is detected for the microphone array.

If no speech activity is detected for a microphone array, it is not necessary to transmit the signals incident to this microphone array; in other words, signals stemming from such a microphone array can be attenuated.

Advantageously, applying the attenuation can be performed adaptively, preferably by varying the attenuation in predetermined timed steps between zero attenuation and a predetermined maximum attenuation.

For example, if only one speaker is speaking, i.e., only one microphone array is detecting speech activity, the corresponding signals can be transmitted without attenuation and the signals of all other microphone arrays can be attenuated with a predetermined maximum attenuation factor. As soon as the speaker stops speaking, the signals of the corresponding microphone array can be attenuated by a small attenuation factor and, thus, waiting for the speaker to start again. However, should the speaker remain silent, the attenuation factor for the corresponding microphone array will be increased in predetermined time steps over a time interval up to the predetermined maximum attenuation.

According to a preferred embodiment of the previously discussed methods, processing can comprise adaptively determining a gain control of the input signals for each microphone array.

In this way, various factors such as loudness of a speaker or distance between the speaker's head and the corresponding microphone array can be taken into account.

In order to also consider variations or changes of these factors during operation, in an advantageous embodiment, determining a gain control can be performed adaptively.

According to a preferred embodiment, all previously discussed methods can further comprise selecting at least one output channel out of at least two output channels on which the process signals are to be output.

In particular, in the case of a vehicular cabin, each seat may have an associated microphone array and loudspeaker wherein the loudspeaker can be the standard car radio loudspeaker. In such a case, it is preferred that speech signals of a speaker are not output by a loudspeaker being associated with this speaker. For example, if the driver or the front seat passenger are speaking, the selecting step can result in that these signals of the front row can be output only by the rear loudspeakers.

Preferably, selecting the at least one output channel can comprise determining an amplification for each selected output channel. In this way, the ambient noise can be taken into account for each selected output channel separately. If, for example, a passenger opens the window, the output channel leading to the corresponding loudspeaker can be provided with a corresponding amplification.

The invention further provides a computer program product directly loadable into an internal memory of a digital computer, comprising software code portions for performing the steps of one of the previously described methods.

The invention further provides a computer program product stored on a medium readable by a computer system, comprising computer readable program means for causing a computer to perform the steps of one of the previously described methods.

In addition, the invention provides a communication system for performing the above-discussed methods. In particular, a communication system is provided comprising:

at least two microphone arrays each comprising at least two microphones to produce microphone signals, at least one analog/digital converter having an input for receiving said microphone signals and an output for providing digital microphone signals, digital signal processing means having an input for receiving the digital microphone signals, being configured to process the digital microphone signals of each microphone array by a beamformer to determine temporal and spatial information about the microphone signals of each microphone array, and having an output to provide processed output signals to at least two loudspeakers.

Such a communication system improves the speech or communication quality in a noisy environment, for example, in a vehicular cabin, and can be implemented in a very compact form.

Preferably, the digital signal processing means can further be configured to process the digital microphone signals of each microphone array by a wanted signal beamformer to obtain a wanted signal and by a blocking beamformer to obtain a blocking signal, preferably wherein the wanted signal beamformer is an adaptive beamformer.

According to an advantageous embodiment, the digital signal processing means can be configured to decide whether a signal is transmitted from a wanted signal direction, wherein the wanted signal beamformer is an adaptive beamformer being configured to be adapted only if no signal is transmitted from the wanted signal direction.

Preferably, the digital signal processing means can be configured to determine a wanted signal power and a blocking signal power, wherein the wanted signal beamformer is adapted only if the blocking signal power is larger than a predetermined constant times the wanted signal power According to a preferred embodiment, the digital signal processing means can be further configured to detect speech activity for each microphone array.

Preferably, the digital signal processing means can further be configured to apply an attenuation to the processed digital microphone signals of a microphone array if no speech activity is detected for the microphone array.

In an advantageous embodiment, the digital signal-processing means can be configured to select at least one loudspeaker out of the at least two loudspeakers upon which the process signals are to be output.

The invention further provides a vehicular cabin comprising one of the previously discussed communication systems and at least two loudspeakers wherein each microphone array and each loudspeaker is associated with a passenger's seat.

In particular, the loudspeakers can be the standard car radio loudspeakers that are typically already present in a vehicular cabin. In this way, communication in a vehicular cabin can be highly improved without requiring sophisticated modifications of the vehicular cabin.

Further features and advantages of the invention will be described in the following with reference to examples and to the drawings in which.

Figure 1:
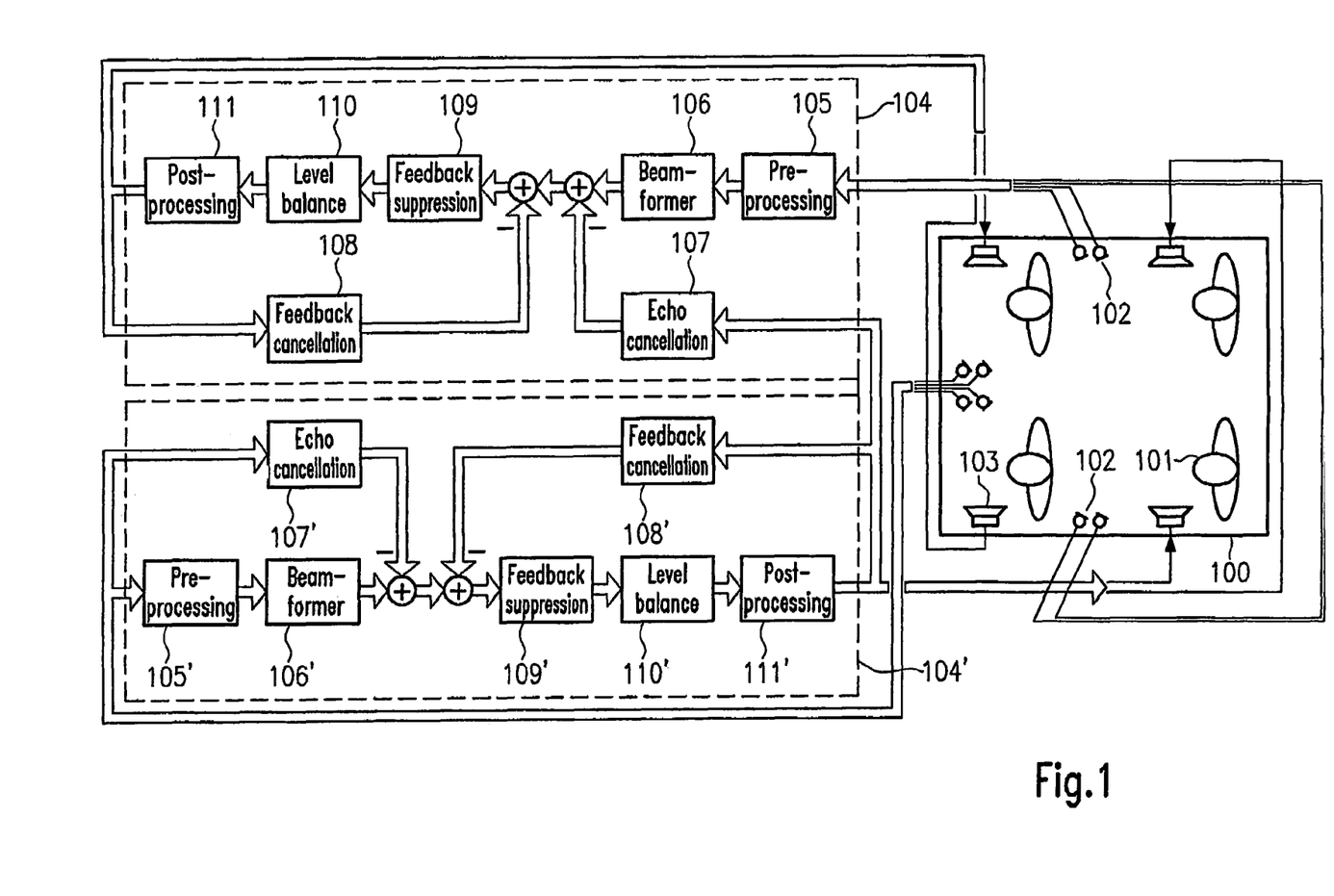
FIG. 1 is a schematic overview of a method to enhance communication in a vehicular cabin.

An overview of a system for improving communication in a vehicular cabin 100 is shown in FIG. 1. The vehicular cabin 100 comprises four passenger seats (not shown) and four passengers 101. With each passenger, a microphone array comprising two microphones 102 and a loudspeaker 103 are associated. For the front passengers, the microphone arrays are arranged in the center between the passengers. They can be provided at the car roof, for example. At the rear seats, the microphone arrays are provided at the left and right side of the passengers, respectively, for example, in the car door.

The microphone arrays record signals. The signals emanating from the microphone arrays enter digital signal processing means 104 and 104'. In the example shown in FIG. 1, a first signal processing means 104 is responsible for processing the signals emanating from the microphones associated with the rear passengers and a second digital signal processing means 104' is associated with the signals emanating from the microphones associated with the front passengers. However, this is only a matter of choice and the signals emanating from the different microphone arrays and also the signals output by the different speakers can be processed in different combinations.

The signals emanating from the microphone arrays, first of all, are processed by an analog/digital converter which is part of pre-processing means 105 and 105'. Of course, the analog/digital converter can also be present separately. The pre-processing step is followed by a beamformer 106 and 106'. The beamformers serve to obtain information on the temporal signal behavior and also spatial information about the signal sources of both wanted (e.g. passengers) and noise signal sources (e.g. car radio loudspeakers).

To avoid feedback effects, echo and feedback components are subtracted from the signals via adaptive echo cancellation 107 and 107' and feedback cancellation 108 and 108'. For controlling these cancellation filters, a saturation detection can be used as will be also described in more detail below.

In order to further reduce any feedback effects, the system can try to detect any build up of the system and to react accordingly. For this, potential feedback frequencies are detected in a suitable way, and, then, corresponding notch filters placed at these frequencies. Adaptive notch filters 109 and 109', therefore, detect potential feedback frequencies and attenuate these.

Based on the temporal and the spatial information from the beamformers, attenuators are controlled such that, for example, only the loudest speaker is switched through. Such an attenuation depending on the other signals is performed by the level balance 110 and 110'.

It is to be noted that also a so-called double talk is possible wherein not only one, but several speakers can be switched through. In any case, the signals of microphone arrays associated with non-active speakers are attenuated. The level balance 110 and 110' is also responsible for determining an amplification for the output signal depending on a background noise.

The level balance is followed by a post-processing 111 and 111', applying a boundary characteristic. The output signals of the digital signal processing means 104 and 104' are fed, first of all, to corresponding loudspeakers 103. In the example shown in FIG. 1, signals emanating from rear microphone arrays can only be output by front loudspeakers and vice versa. This is, however, not a necessary restriction; the system can also be configured, for example, such that the processed signals can be output via all loudspeakers except the loudspeaker corresponding to the microphone array of the input signals.

Furthermore, the processed signals are also fed to the feedback cancellation 108 and 108' of the same digital signal processing means and also to the echo cancellation means 107 and 107' of the other digital signal processing means.

Figure 2:
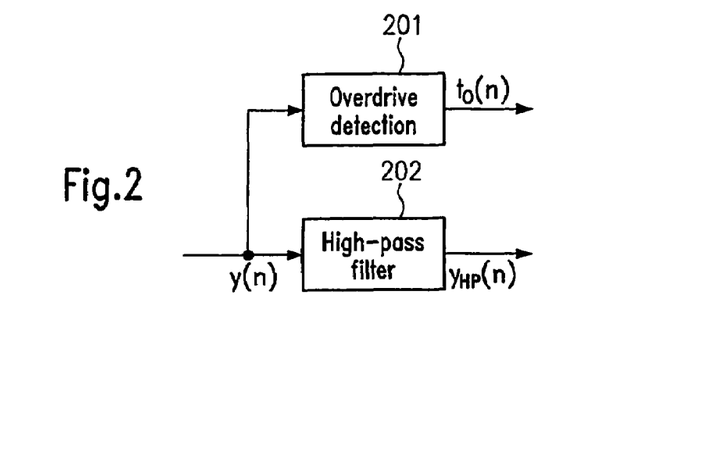
FIG. 2 depicts a block diagram of a pre-processing of a microphone signal.

The pre-processing step is illustrated in more detail in FIG. 2. For all incoming microphone signals y(n) an overdrive detection 201 is performed. This is accomplished by comparing the absolute value of each signal value with a predetermined threshold value. If the absolute value of the signal value is larger than the threshold, a detection variable $t_0(n)$ is set. This detection variable is held for a predetermined time interval. During this time interval, all adaptive algorithms are controlled more slowly. In this way, a malfunctioning of the cancellation of echoes and feedback due to an overdrive can be avoided.

Furthermore, each microphone signal y(n) is passed through a high pass filter 202 yielding a high pass filtered microphone signal $y_{HP}(n)$. For example, signal components (such as background noise) below the typical lowest speech frequencies (100 Hz-200 Hz) can be removed. As in the case of all other signal processing components, the delay time of the high pass filter should be minimal which is to be taken into account when designing the filter. Preferably, the delay time through the whole signal processing system should be less than 10 ms.

Figure 3:
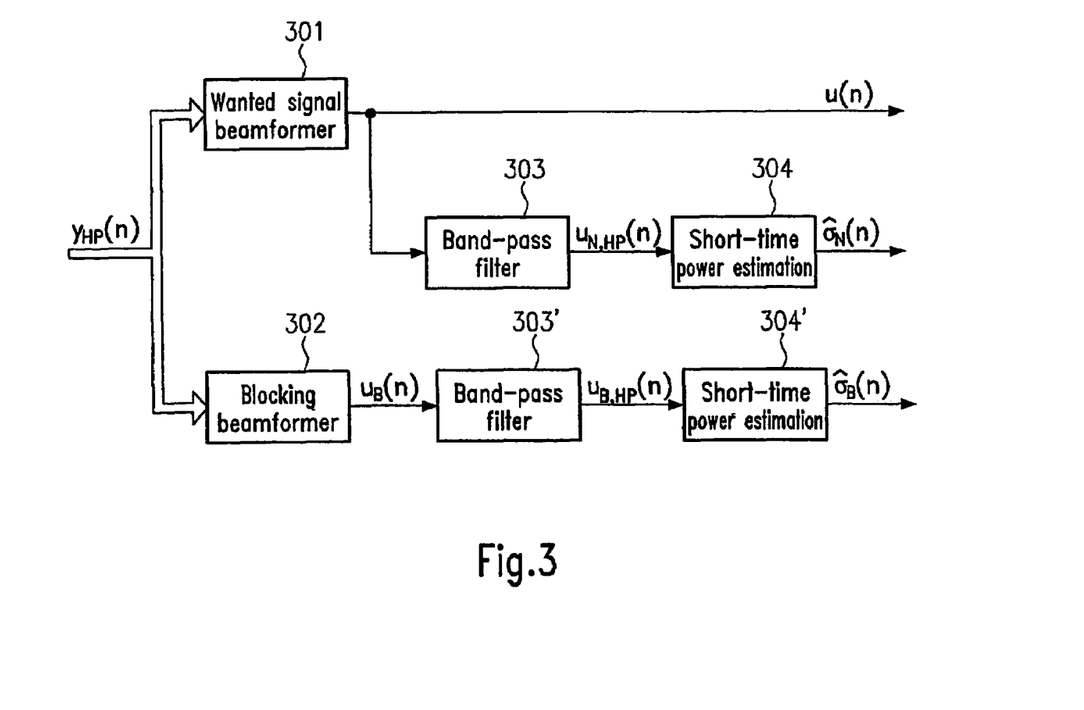
FIG. 3 depicts a block diagram of processing a signal by a wanted signal beamformer and a blocking beamformer.

The high pass filtered microphone signals $y_{HP}(n)$ are supplied to the beamformers 106 or 106'. A preferred example of such a beamformer is illustrated in FIG. 3. The beamformer comprises a wanted signal beamformer 301 and a blocking beamformer 302. The signals $y_{HP}(n)$ are supplied to both the wanted signal beamformer 301 and the blocking beamformer 302. In the wanted signal beamformer 301, the microphone signals are combined by digital filters in such a way that signals stemming from a preferred direction (direction from the corresponding microphone array to a respective passenger) are transmitted without attenuation and the signal components of all other directions are attenuated as high as possible. In the blocking beamformer 302, on the other hand, all signals from the wanted signal direction are suppressed as far as possible, and signal components from all other directions of incidence are to be transmitted with minimum distortion.

The output signals of the wanted signal beamformer u(n) and of the blocking beamformer $u_B(n)$ will be used in the following signal processing units for controlling different components. In particular, information regarding speech activity and directional information will be obtained, based on these signals.

First of all, both signals are passed through band pass filters 303 and 303' yielding output signals $u_{N,HP}(n)$ and $u_{B,HP}(n)$. Low frequency signal components will be removed in this way. As for low frequencies, the wanted signal beamformer has almost no directivity and almost no signals can pass the blocking beamformer. For high frequencies, both beamformers have a poor directivity. These band pass filtered signals are used to determine short time powers $\hat{\sigma}_N(n)$ and $\hat{\sigma}_B(n)$. According to a first order recursive filtering:

$$\hat{\sigma}_N(n)=\beta\hat{\sigma}_N(n-1)+(1-\beta)|u_{N,HP}(n)|, \quad (2)$$

$$\hat{\sigma}_B(n)=\beta\hat{\sigma}_B(n-1)+(1-\beta)|u_{B,HP}(n)|. \quad (3)$$

The quantities $u_{N,HP}(n)$ and $u_{B,HP}(n)$ designate the high pass filtered form of the wanted signal beamformer output and the blocking beamformer output. Preferably, the constant $\beta$ should take a value $\beta \in [0.9,\ldots,0.999]$. By comparing both short time powers, different speech scenarios can be determined, for example:

- if no passenger is speaking, a diffuse noise field is present in the vehicular cabin and both short time powers should have approximately the same value (after removal of distortions);
- if a passenger is speaking onto which the corresponding wanted signal beamformer is directed, the short time power of this wanted signal beamformer will be larger than the short time power of the blocking beamformer output;
- if one of the other passengers is speaking which is not located in wanted signal direction, the short time power of the blocking beamformer will be larger than the short time power of the wanted signal beamformer.

As already stated above, also in the case of the beamformers and the band pass filters, the delay time should be minimal.

The directivity of the wanted signal beamformer can be further enhanced by taking an adaptive beamformer. This can be achieved, for example, by using a so-called Griffith-Jim structure which is an example of a generalized sidelobe canceller (GSC) and illustrated in FIG. 4. The extraction of the spatial information $\hat{\sigma}_N(n)$ and $\hat{\sigma}_B(n)$ is determined by extraction means 401 as already described above. Only the output signal of the wanted signal beamformer u(n) is determined using the enlarged adaptive structure.

Figure 4:
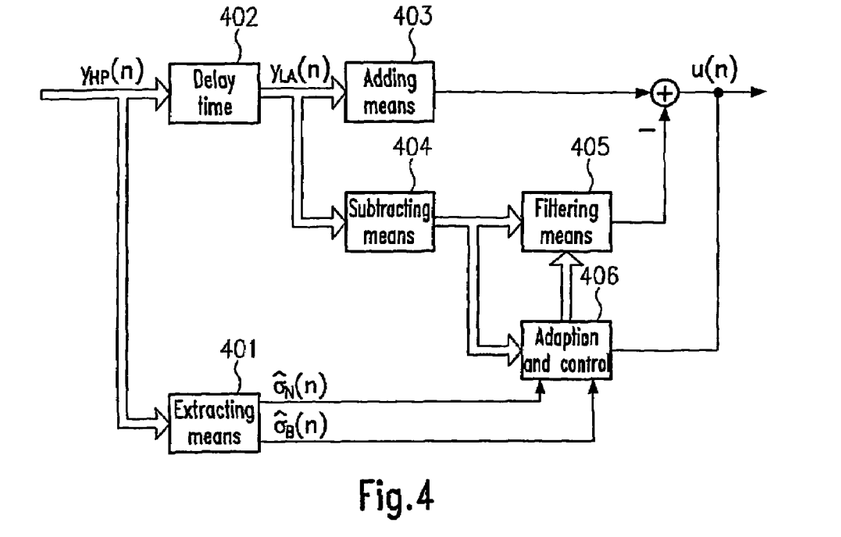
FIG. 4 depicts an adaptive wanted signal beamformer with a Griffith-Jim structure.

As in a standard beamformer, first of all, a delay time compensation 402 is performed yielding an output signal $y_{LA}(n)$. Now, two processing paths are followed. On a first path, the signals corresponding to the different microphones of a microphone array are summed in an adding means 403 as in the case of a standard fixed beamformer. On the second, adaptive path, the signals of the different microphones of the microphone array are subtracted from each other by a subtracting means 404. The resulting signals are passed through adaptive filters 405, the adaption and control of which is performed by the adaption and control means 406.

The adaptive structure used in this invention differs from prior art methods in the control of the adaptive part of the beamformer. An adaption is only performed if no signal from the wanted signal direction is transmitted. This condition is checked using the inequality:

$$\hat{\sigma}_B(n) > K_{BF}\hat{\sigma}_N(n) \quad (4)$$

wherein the constant $K_{BF}$ is chosen appropriately. Due to this type of control, it is possible to operate the system of the invention even if specific noise sources such as a car radio are present. If none of the passengers is speaking, the signals of the car radio are output by the standard car radio loudspeakers. The controlled adaption of the mounted signal beamformer allows to direct the spatial zeros of the beamformer to the position of the loudspeakers. In this way, it is possible to achieve a highly advantageous signal suppression (e.g., of the car radio signals) without complicated multi-channel echo cancellation. If the same loudspeakers are used at the same time for reproducing the car radio signals and the speech signals of the communication system, an adaption during speech pauses increases the stability of the communication system and reduces the liveness of the signals to be reproduced.

In order to reduce the echo and feedback components in the beamformer output signals, an echo cancellation 107 and 107' and a feedback cancellation 108 and 108' are determined. For controlling the cancellation filters, an overdrive detection as described above can be used to further reduce any feedback effects; potential build up frequencies are detected by the feedback suppression means 109 and 109' in order to place corresponding narrow band notch filters at these frequencies.

An important component of the method and the system of the invention is the adaptive attenuation control. This attenuation control can be divided into three parts:

1) First of all, it is to be detected whether one or several of the passengers are speaking, the signal of the respective active passenger or passengers are to be output by loudspeakers located in the vicinity of the other passengers.
2) Since the position of the seats and, therefore, also the distance between the speakers and the microphones of a corresponding microphone array is known a priori only approximately, an automatic gain control is to be determined for each beamformer output. In this way, not only a varying loudness due to varying distances but also level differences due to speakers having different loudness can be compensated for.
3) For each seat, an individual output volume can be determined. This volume depends on the respective background noise levels and may vary with different driving scenarios (e.g., in the city or on the highway). This volume control or amplification will be determined for each seat or output loudspeaker separately. If, for example, one of the passengers opens a window, the corresponding output volume for this seat can be increased with respect to the other seats.

Figure 5:
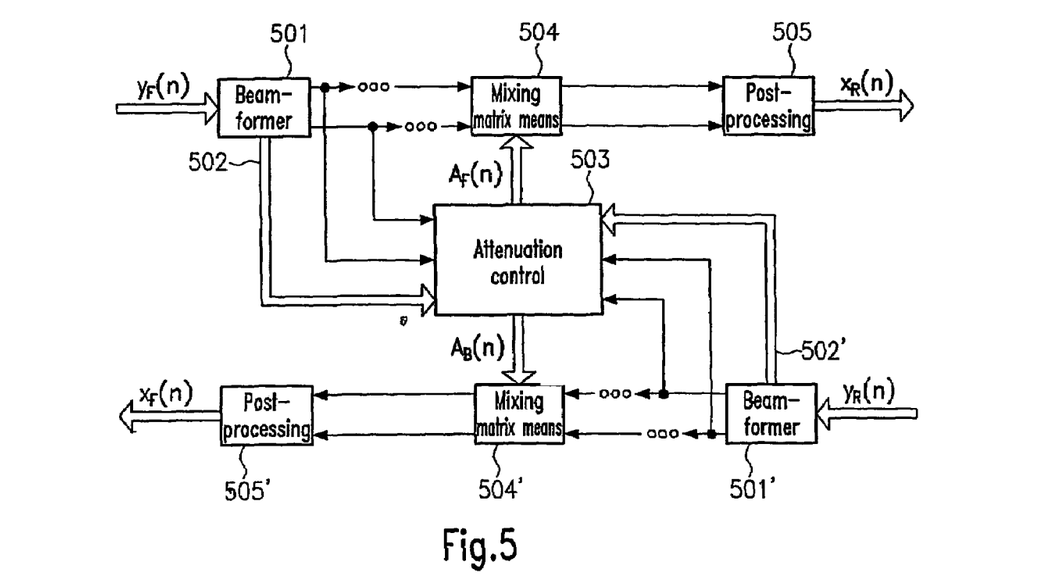
FIG. 5 depicts a block diagram of an attenuation control.

FIG. 5 illustrates an example of an attenuation control. Signals stemming from front microphones $y_F(n)$ and rear microphones $y_R(n)$ are supplied to corresponding beamformer 501 and 501'. Short time powers 502 and 502' are supplied to the central attenuation control 503. This attenuation control yields mixing matrices to be applied to the signal by mixing matrix means 504 and 504'. After a post-processing 505 and 505', output signals for the rear loudspeakers $x_R(n)$ and for the front loudspeakers $x_F(n)$ are obtained.

In the two mixing matrices, $A_F(n)$ and $A_R(n)$, the output signals of the front and the rear beamformers are combined for the post-processing and, thus, for the rear and the front loudspeakers. By designating the output signals of the front beamformer by $u_{F,left}(n)$ and $u_{F,right}(n)$ and the output signals of the rear beamformer by $u_{R,left}(n)$ and $u_{R,right}(n)$, the mixing can be described by $$\underbrace{\begin{bmatrix} d_{R,left}(n) \\ d_{R,right}(n) \end{bmatrix}}_{d_R(n)} = \underbrace{\begin{bmatrix} a_{F,11}(n) & a_{F,12}(n) \\ a_{F,21}(n) & a_{F,22}(n) \end{bmatrix}}_{A_F(n)} \underbrace{\begin{bmatrix} u_{F,left}(n) \\ u_{F,right}(n) \end{bmatrix}}_{u_F(n)} \quad (5)$$

$$\underbrace{\begin{bmatrix} d_{F,left}(n) \\ d_{F,right}(n) \end{bmatrix}}_{d_F(n)} = \underbrace{\begin{bmatrix} a_{R,11}(n) & a_{R,12}(n) \\ a_{R,21}(n) & a_{R,22}(n) \end{bmatrix}}_{A_R(n)} \underbrace{\begin{bmatrix} u_{R,left}(n) \\ u_{R,right}(n) \end{bmatrix}}_{u_R(n)} \quad (6)$$

Figure 6:
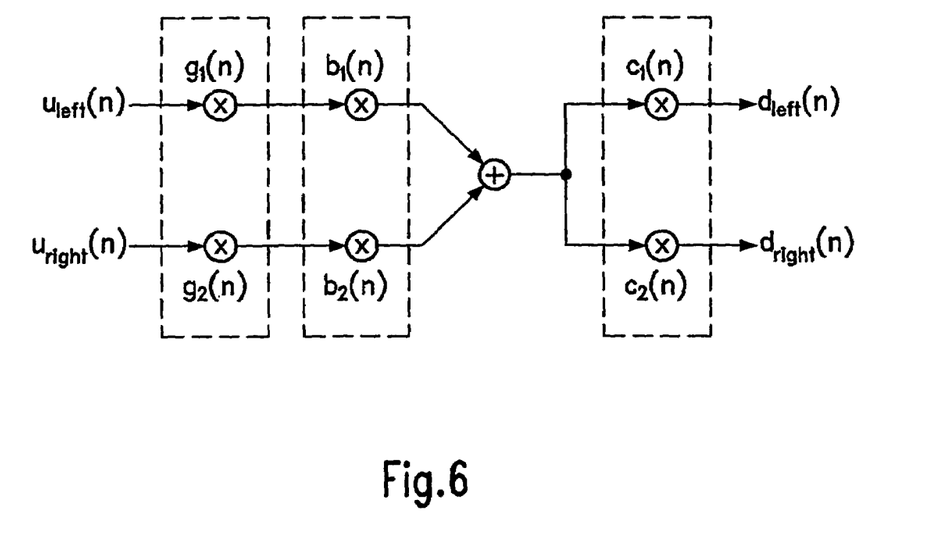
FIG. 6 illustrates in a block diagram the determining of mixing coefficients for the attenuation.

When determining the mixing coefficients, the three parts of the attenuation control will be determined separately (see FIG. 6). In a first step, an automatic gain control will be calculated. During speech activity, the speech level is determined and compared to a reference value. If the speech level (increased or decreased by the corresponding corrections factor) is smaller than the reference value, a small increase of the correction value is performed; if, on the other hand, the speech level is larger than the reference value, the correction value will be decreased.

In a second step, the active speaker is determined. Only the beamformer output signal of the active speaker will be output by the loudspeakers being situated in the vicinity of the other passengers. In the present example, there is only an output from the front row to the rear row and vice versa. A speech enhancement from the left to the right or vice versa is not performed. However, this represents only an illustrative example which is not intended as a restriction; in particular, other combinations of input and output are possible as well.

In a third step, an output volume depending on the noise level is determined for each seat. This value does not depend of the respective speech activity but only on the background noise level specific for each seat.

These components of the mixing matrices is illustrated in FIG. 6. For sake of clarity, the index identifying the front or rear row has been omitted. First of all, the coefficients of the automatic gain control $g_i(n)$ are determined. Then, the coefficients of the speech controlled attenuation $b_i(n)$ and the coefficients of the noise dependent volume adaption $c_i(n)$ are determined. This yields the following mixing coefficients:

$$a_{11}(n)=g_1(n)b_1(n)c_1(n) \quad (7)$$

$$a_{12}(n)=g_2(n)b_2(n)c_1(n) \quad (8)$$

$$a_{21}(n)=g_1(n)b_1(n)c_2(n) \quad (9)$$

$$a_{22}(n)=g_2(n)b_2(n)c_2(n) \quad (10)$$

For the automatic gain control, a mean speech level $\hat{\sigma}_{N,Act}(n)$ is estimated during speech activity. This is achieved by a multiplicative correction of the form $$\hat{\sigma}_{N,Act}(n) = \begin{cases} \hat{\sigma}_{N,Act}(n-1)K(n), & \text{for speech activity} \\ \hat{\sigma}_{N,Act}(n-1), & \text{else.} \end{cases} \quad (11)$$

The correction factor is determined according to $$K(n) = \begin{cases} K_r, & \text{if } \hat{\sigma}_{N,Act}(n-1) < \hat{\sigma}_{N,Act}(n) \\ K_f, & \text{else.} \end{cases} \quad (12)$$

wherein $K_r>1$ and $K_f<1$. As in the previous section, the index identifying the respective seat has been omitted for sake of clarity. To determine the speech activity, for each seat, the background noise estimation $\hat{\sigma}_H(n)$ is performed. For this, the short time power of the wanted signal beamformer $\hat{\sigma}_N(n)$ is determined according to Equation (1).

In order to detect speech activity, the following conditions are to be fulfilled:

$$\hat{\sigma}_N(n) > K_1 \hat{\sigma}_H(n) \quad (13)$$

$$\hat{\sigma}_N(n) > K_2 \hat{\sigma}_B(n) \quad (14)$$

By condition (13), temporal information and by condition (14) spatial information regarding speech detection are checked. The use of microphone arrays comprising at least two microphones enables to obtain the required signals for the spatial condition (14). With high background noise levels, the spatial criteria seems to be more robust than the temporal criteria.

To determine the attenuators $b_i(n)$, a so-called nominal status is estimated. This is achieved by detecting whether one or several passengers are speaking. In analogy to the speech activity detection that was previously discussed; in particular, conditions (13) and (14) are both to be fulfilled. If this is the case, a loudest speaker is determined by comparing the beamformer output powers. For the seat with the loudest speaker, the nominal attenuation is set to 0 dB. All other seats will have a nominal attenuation value larger than 0 dB. If no passenger is speaking at all, the same procedure is performed with the exception that only the attenuation value of the previously active speaker is set to a lower attenuation value. If no speech activity is detected over a predetermined time interval, also the attenuation of the previous active passenger is set to the value of the other maximum attenuation.

The nominal values of the attenuation are used to determine the proper attenuation factors $b_i(n)$ via a first order recursive smoothing with suitable time constants. If two or more passengers are speaking at the same time, the detection of the respective most active passenger, depending on the volume of each speaker, will usually change several times. Due to the recursive smoothing, the attenuators of the active passengers will add only a small attenuation. In this way, several directions can be enhanced at the same time.

After having weighted and summed in pairs the beamformer output signals of the different seats, a noise dependent amplification $c_i(n)$ is determined for each seat. For the case that the vehicle is not moving and the engine is switched off, these coefficients are normalized to 0 dB. With increasing driving speed, also the roll wind and engine noise is increasing. In order to take these changes into account, the output signal of the system are to be amplified. For this, the estimated background noise levels $\hat{\sigma}_{H,i}(n)$ are compared with several thresholds. As soon as the background noise level passes one of the thresholds, an increase of the output volume is performed. This can be done, for example, in the range of 0 dB to about 10 dB. As the background noise estimations are determined based on the beamformer output powers and, thus, a spatial separation of the different seats is possible, an individual output volume can be determined for each seat. This is particularly desirable if, for example, one of the windows of the vehicle is open. In this case, the volume mainly of the loudspeakers in the vicinity of this seat is to be increased. Before outputting the weighted and—depending on the background noise—amplified signal via the loudspeakers, limiter characteristics can be applied to the signals. In this way, short but loud passages can be diminished without reducing the volume of the overall signal.

The invention claimed is:

1. A method for enhancing communication in a noisy environment comprising:
   receiving input signals emanating from at least two microphone arrays each comprising at least two microphones; and
   processing the input signals of each microphone array by an adaptive wanted signal beamformer and a blocking beamformer, the processing comprising:
   determining temporal and spatial information about the input signals of each microphone array;
   obtaining a wanted signal from the adaptive wanted signal beamformer;
   obtaining a blocking signal from the blocking beamformer; and
   deciding whether a signal is transmitted from a wanted signal direction, the deciding comprising:
   determining a wanted signal power; and
   determining a blocking signal power,
   wherein the adaptive wanted signal beamformer is adapted only if no signal is transmitted from the wanted signal direction, which is determined as when the blocking signal power is larger than a predetermined constant times the wanted signal power.

2. The method of claim 1, further comprising detecting speech activity for each microphone array.

3. The method of claim 2, wherein detecting speech activity for a microphone array comprises:
   determining a wanted signal power, a blocking signal power, and a background noise signal power, comparing the wanted signal power with the blocking signal power and the background noise signal power.

4. The method of claim 3, further comprising comparing the wanted signal powers of at least two microphone arrays and determining a highest power.

5. The method of claim 2, further comprising applying an attenuation to the processed input signals of a microphone array if no speech activity is detected for the microphone array.

6. The method of claim 5, wherein applying the attenuation is performed adaptively, preferably by varying the attenuation in predetermined time steps between zero attenuation and a predetermined maximum attenuation.

7. The method of claim 1, wherein processing comprises determining a gain control of the input signals for each microphone array.

8. The method of claim 7, wherein determining a gain control is performed adaptively.

9. The method of claim 1, further comprising selecting at least one output channel out of at least two output channels on which the processed signals are to be output.

10. The method of claim 9, wherein selecting the at least one output channel comprises determining an amplification for each selected output channel.

11. A communication system comprising:
    at least two microphone arrays each comprising at least two microphones to produce microphone signals;
    at least one analog/digital converter having an input for receiving said microphone signals and an output for providing digital microphone signals;
    a digital signal processor having an input for receiving the digital microphone signals, the digital signal processor configured to:
    process the digital microphone signals of each microphone array by an adaptive wanted signal beamformer and a blocking beamformer, the processing comprising:
    determining temporal and spatial information about the microphone signals of each microphone array;
    obtaining a wanted signal from the adaptive wanted signal beamformer;
    obtaining a blocking signal from the blocking beamformer; and
    deciding whether a signal is transmitted from a wanted signal direction, the deciding comprising:
    determining a wanted signal power; and
    determining a blocking signal power,
    wherein the adaptive wanted signal beamformer is adapted only if no signal is transmitted from the wanted signal direction, which is determined as when the blocking signal power is larger than a predetermined constant times the wanted signal power; and provide processed output signals to at least two loudspeakers.

12. The communication system of claim 11, wherein the digital signal processor is further configured to select at least one loudspeaker out of the at least two loudspeakers on which the processed signals are to be output.

13. A vehicular cabin comprising a communication system according to claim 11 and at least two loudspeakers, wherein each microphone array and each loudspeaker is associated with a passenger seat.

* * * * *